Sept. 26, 1933.  R. GOLLONG  1,928,252

MIDDLE GASKET

Filed Dec. 21, 1931

Inventor
Richard Gollong.
By Frank Toohey Jr.
Attorney

Patented Sept. 26, 1933

1,928,252

UNITED STATES PATENT OFFICE 1,928,252

MIDDLE GASKET

Richard Gollong, Johnson City, Tenn., assignor to American Glanzstoff Corporation, New York, N. Y., a corporation of Delaware Application December 21, 1931
Serial No. 582,673

4 Claims. (Cl. 8—19)

My present invention relates to an improved gasket for use in the washing and treating of artificial silk.

In the production of artificial silk a cellulosic solution is prepared and extruded into a suitable coagulating or hardening medium. The freshly spun threads are wound on perforated or foraminated spools which are then placed in tiers of two or more in a suitable tank. The treating liquors are then passed through the thread layers by the use of either pressure or vacuum. The spools of each tier are separated by means of a gasket, since without such gasket it would not only be impossible to stack the spools but also the vacuum or pressure used could not successfully be maintained.

Accordingly it is an object of my present invention to provide an improved gasket which is efficient in operation and simple of construction.

Another object of my invention is to provide a gasket having means to fit snugly within the interior of the spools.

A further object of my invention is to provide a gasket having means which will prevent any tendency of the gasket from being pulled into the spool when the vacuum washing or treating system is used.

These and other objects of my invention will become more apparent from a perusal of the following description and a study of the drawing in which.

Figure 1:
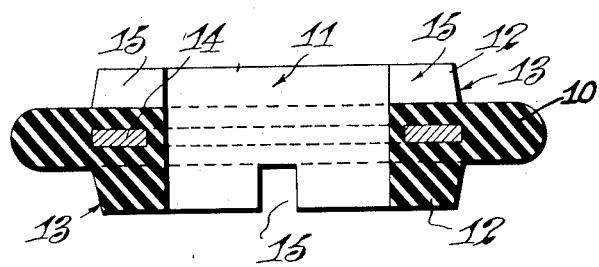
Fig. 1 is a sectional view of my improved gasket.
Figure 2:
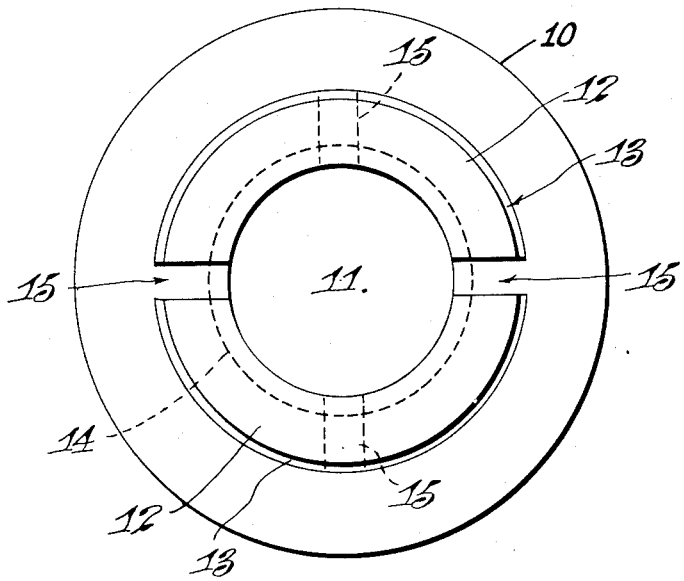
Fig. 2 is a top plan view of the same.

The gasket comprises a ring —10— having a central bore —11— formed therein for the passage of the treating fluids. Hub portions —12— are formed on either side of the ring and, as may clearly be seen, are formed with inclined outer walls —13—. The exterior diameter is such that an end of a spool placed on the ring will fit snugly against the ring and the inner wall of the spool will fit against the hub. Each hub is provided with a bore located concentrically with respect to the bore in the ring. The gasket is made of rubber or other suitable material and the two hubs are formed integrally with the ring. Spaced slots —15— are formed in the hubs and afford a suitable drainage system whereby the treating liquids may be drained off. This prevents any of the acid or treating liquid from dripping on the yarn.

Located within the gasket is a metallic ring —14—. This ring is smaller in width than the hubs and the circumference thereof extends to a point even with the circumferences of the bases of the hubs. By this construction the portions of the gasket which are in contact with the spools possess sufficient flexibility while the inserted metallic ring gives the ring of the gasket sufficient rigidity to prevent the gasket from being pulled into the interior of the spool upon the application of the vacuum used in the vacuum washing or treating system.

Although I have described my invention with reference to the specific embodiment disclosed, it is to be understood that my invention is not specifically limited thereto, but may be modified in many details without departing from the spirit of the invention or the scope of the appended claims.

I claim:

1. In a device of the class described, comprising in combination, a rubber ring, a metallic insert embedded therein, inclined hubs formed integrally with said ring and located on either side thereof, the periphery of said metallic insert being concentric with periphery of said hubs, said hubs having drainage slots formed therein.

2. A gasket adapted to be placed between two spools of artificial thread comprising, in combination, a ring, hub portions formed integrally on either side thereof and adapted to fit snugly within a spool, said hub portions having a plurality of drainage slots formed therein.

3. A gasket adapted to be placed between two spools of artificial thread comprising in combination a ring, hub portions formed on either side thereof and adapted to fit within a spool, a metallic insert embedded in said ring, the periphery of said ring being concentrically disposed with respect to the periphery of said hub portions, said hub portions having formed therein a plurality of spaced drainage slots.

4. A gasket adapted to be placed between two spools of artificial filaments to be wet-treated by the vacuum process, comprising in combination, a rubber ring portion, inclined hubs formed integrally therewith and adapted to closely engage the inner surfaces of the two spools, a flat metallic reinforcing ring imbedded in said rubber ring portion, and so arranged that the ring will not be sucked into the spools by the application of vacuum, and drainage slots arranged in said inclined hubs whereby the acids etc. washed from the silk may be carried away.

RICHARD GOLLONG.